United States Patent [19]
Williams, Jr.

[11] Patent Number: 6,108,686
[45] Date of Patent: Aug. 22, 2000

[54] AGENT-BASED ON-LINE INFORMATION RETRIEVAL AND VIEWING SYSTEM

[76] Inventor: Henry R. Williams, Jr., 11 Broadway, Third Floor, New York, N.Y. 10004

[21] Appl. No.: 09/034,773

[22] Filed: Mar. 2, 1998

[51] Int. Cl.$^7$ .................................................. G06F 15/16
[52] U.S. Cl. ........................... 709/202; 709/203; 709/217
[58] Field of Search .................................... 709/202, 203, 709/217; 707/1–6, 10, 516, 104

[56] References Cited

U.S. PATENT DOCUMENTS

| | | | |
|---|---|---|---|
| 5,722,041 | 2/1998 | Freadman | 355/6.3 |
| 5,819,273 | 10/1998 | Vora et al. | 707/10 |
| 5,855,015 | 12/1998 | Shoham | 707/5 |
| 5,920,856 | 7/1999 | Syeda-Mahmood | 707/3 |
| 5,974,441 | 10/1999 | Rogers et al. | 709/200 |
| 5,983,200 | 11/1999 | Slotznick | 705/26 |
| 5,983,218 | 11/1999 | Syeda-Mahmood | 707/3 |
| 6,009,422 | 12/1999 | Ciccarelli | 707/4 |
| 6,029,165 | 2/2000 | Gable | 707/3 |

OTHER PUBLICATIONS

Sameer Madan, "Search the Web without a Headache," PC World (India), pp. 40–41, Feb. 1998.

Lingnau et al, "An HTTP–based Infrastructure for Mobile Agents," http://www.w3.org/Conferences/WWW4/Papers/150/, pp. 1–15, 1995.

Patricia Smith, "Web Compass Takes Web Searching in the Right Direction," Seybold Report on Desktop Publishing, vol. 10, No. 10, pp. 1–9, 1996.

Egyhazy et al, "Intelligent Web Search Agents," http://csgrad.cs.vt.edu/ntplunket/article.html, pp. 1–23, no date.

"Intermind Announces Approval of First Patent Application," dated Oct. 7, 1997, downloaded from http://www.intermind.com/inside/press_rel/100797_allow.html, 3 pages.

"About Intermind's Channel Communications Patents," downloaded from http://www.intermind.com/materials/patent_desc.html on Feb. 27, 1998, 5 pages.

"Frequently Asked Questions about Intermind's Patents," downloaded from http://www.intermind.com/materials/patent_faq.html on Feb. 27, 1998, 9 pages.

*Primary Examiner*—Mehmet B. Geckil
*Attorney, Agent, or Firm*—Blakely, Sokoloff, Taylor & Zafman LLP

[57] ABSTRACT

A Subject-specific Information Retrieval and Viewing System (SIRViS) enables multiple users of a local computer system to access information stored remotely on a wide area network. The SIRViS is designed to retrieve and display to a user information relating to a particular, predefined subject area. The SIRViS includes a graphical user interface including a control panel and a content viewer. The control panel enables each local user to define a unique set of search rules for locating information on the particular subject area stored in one or more remote databases across the network. The control panel provides each set of search rules to a search agent, which accesses content in the remote databases according to the search and stores the information in a local database, including maintaining the overall structure in which the data was stored in the remote database and associating retrieved information with particular sets of search rules. Any of the local users can use the content viewer to access and display information stored in the local database relating to the particular subject area and to that particular user. The local processing system may include multiple SIRViS, each of which is customized to retrieve and display information in a different subject area.

33 Claims, 6 Drawing Sheets

AGENT-BASED ON-LINE INFORMATION RETRIEVAL AND VIEWING SYSTEM

FIELD OF THE INVENTION

The present invention pertains to the field of computer networking. More particularly, the present invention relates to techniques for retrieving and viewing information on a wide area network.

BACKGROUND OF THE INVENTION

A number of technologies are currently available to allow consumers to access information stored remotely on networks such as the Internet, corporate intranets, etc. Browsers, for example, are a well-known class of software applications which enable computer users to download hypertext pages and other types of data from the World Wide Web and other remote sources. Another, more recently developed information access technology is commonly referred to as "push" technology. With push technology, a remote server generally gathers information on various topics from remote databases, packages the information into subject groupings called "channels", and automatically downloads selected channels to the user's computer. The user does not need to search for or request the information. The retrieved information may be automatically stored locally on the user's computer, such that the user can browse the information off-line at a time of his own choosing.

While information access technology has made significant advances, conventional information access tools have several problems, which prevent consumers from obtaining the full benefit of on-line information. One problem is the speed at which remotely stored information can be delivered to a user. Although the achievable data rates are generally increasing, very high speed data connections, such as T1 lines and the like, tend to be too expensive for individual consumers to afford and therefore tend to be limited mainly to commercial uses. Further, steadily increasing delays due to increased network usage contribute to the speed problem.

Push technology and local caching may be partial solutions to the speed issue. However, these solutions do not address a second problem, which is organization. In particular, conventional technologies, such as browsers and push technology, generally are focused on presentation rather than organization. Consequently, these technologies often do not provide information to a user in such a manner that it can be easily assimilated. This problem of organization is analogous to the notion of clipping articles out of a newspaper. Over time, a person may find a large number of newspaper articles interesting and therefore clip them out for future use. However, if the person ever wanted to see, for example, all of the articles from a particular newspaper, by a particular writer, and written in a particular month, he might find it difficult to sort through all of the accumulated articles. Essentially the same problem exists with regard to on-line information retrieved using conventional tools, such as Web browsers and push technology. Web pages, for example, have traditionally been designed to be pleasing in appearance, but not necessarily the most effective means of conveying large volumes of information to a user. Push technologies provide some improvement in organization by using channels or the like, but generally do not provide a user-friendly way for a person to access large volumes of stored information in the event that he wishes to archive the information for later use.

Hence, it is desirable to provide a technology for accessing information stored remotely on a network, such as the Internet, which overcomes the above noted disadvantages of conventional information access technologies. In particular, what is needed is an information access technology which provides a user with improved speed of access and improved organization of the delivered information.

SUMMARY OF THE INVENTION

The present invention includes a method of providing multiple local users with information stored remotely on a network. For each of the local users, a unique set of search criteria is generated relating to a single, predefined subject. Information relating to only the predefined subject is retrieved from a database on the network based on each set of search criteria, and the retrieved information is stored in a local database accessible to the local users. In particular embodiments, the present invention may include a user interface which enables each of the local users to access, from the local database, the information on the predefined subject and associated with the corresponding set of search criteria. Also, in particular embodiments the information is stored in the remote database according to a particular structure, and the search agent stores the information in the local database according to the same structure. Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
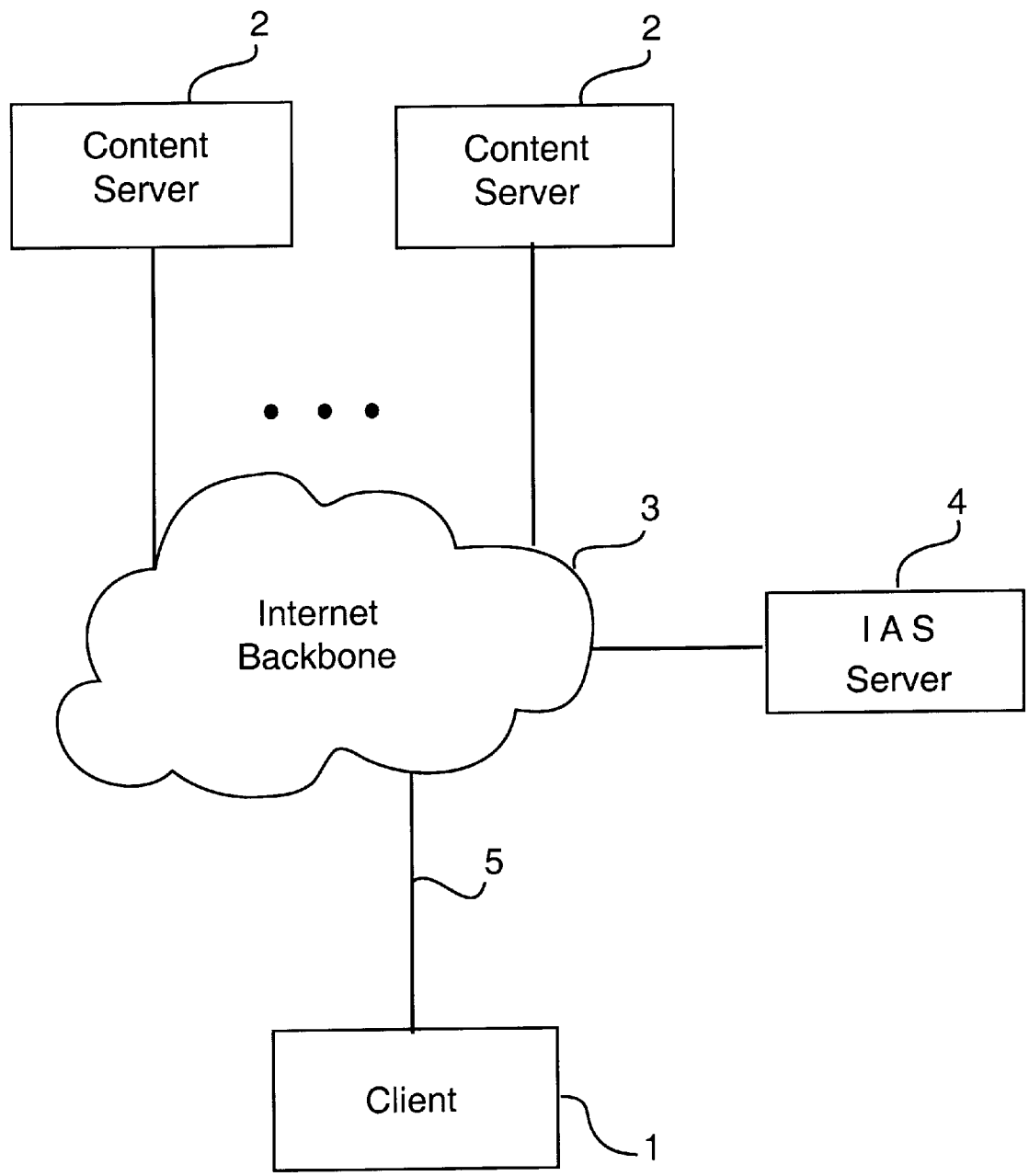
FIG. 1 illustrates a client computer system connected to a number of remote server computer systems on the Internet.

An agent based on-line information retrieval and viewing system is described. In the following description, for purposes of explanation, numerous specific details are set forth in order to provide a thorough understanding of the present invention. It will be evident to one skilled in the art, however, that the present invention may be practiced without these specific details. In other instances, well-known structures and devices are shown in block diagram or other symbolic form in order to facilitate description of the present invention.

The present invention pertains to a technique for enabling multiple users of a local computer system to retrieve information stored in one or more remote servers on a network, such as on the Internet. As will be described, the present invention includes a Subject-specific Information Retrieval and Viewing System (SIRViS), which enables multiple users of a local computer system to access information stored remotely on the network. The SIRViS is designed to retrieve and display information relating only to a particular, predefined subject area, in a manner that is tailored to each of multiple local users. The SIRViS generally includes a graphical user interface (GUI) and a search agent. A control panel component of the GUI enables each local user to define his own unique set of search rules for locating information on the particular subject area stored in one or more remote databases on the network. The control panel provides each set of search rules to the search agent. The search agent then automatically accesses content in the remote databases according to the search and stores the information in a local database. The search agent may retrieve the information periodically or at specified days or times, for example. Using a content viewer component of the GUI, each local user can access information stored in the local database relating to the particular subject area and corresponding to his own set of search rules. The local storage of retrieved information improves the overall speed of access perceived by the user.

In contrast with conventional information access techniques, such as Web browsers and push technology, the search agent stores information in the local database using the same organizational structure in which the information was stored in the remote database. This structure is selected in advance to be suitable for effectively conveying information on the predefined subject area to a user in a format that can be easily assimilated. The present invention is not limited to use with any particular type of data structure. However, the designer of a given SIRViS will have knowledge of the data structure used in the appropriate remote databases and will design the search agent and the content viewer to be compatible with this structure. Thus, the maintenance of the structure of the retrieved information and the subject-specific nature of the SIRViS improve the organization of information delivered to the user, in comparison to traditional techniques.

FIG. 1 illustrates a network configuration in which the present invention can be employed. In FIG. 1, a client computer system 1 is connected to one or more remote server computer systems ("content servers") 2 by the Internet 3. The client system 1 may have multiple users who wish to access, from time to time, information stored in databases on the content servers 2 relating to various topics, such as news, cooking, weather, sports, etc. Accordingly, one or more SIRViS operating in the client system 1 allow the users to access that information. In the description which follows, it is generally assumed that a SIRViS is embodied as application software which executes on the client computer system 1. Note, however, that a SIRViS and any component thereof can alternatively be embodied in hardware or in a combination of hardware and software.

Associated with the present invention is a proprietary, subscription information access service (IAS). The IAS creates and maintains multiple SIRViSs, each custom-designed to retrieve and display information on a specific subject. Each SIRViS maintains knowledge of the locations of one or more particular databases on its associated subject in one or more particular content servers 2. A user of the client system 1 subscribes to the IAS to receive at least one SIRViS for accessing information on the remote content servers 2. Accordingly, the IAS maintains one or more server computer systems ("IAS server") 4 connected to the Internet. One or more appropriate SIRViS can be downloaded to the client system 1 from the IAS server 4 via the Internet 3. The client system 1 may also have a direct (e.g., dial-up) connection to the IAS server 4, through which a SIRViS can be downloaded to the client system 1. Alternatively, one or more SIRViS can be loaded into the client system 1 from a portable storage medium, such as a magnetic disk or tape, a magneto-optical (MO) storage device, or any of various types of optical storage media, such as Digital Versatile Disk (DVD) or compact disk ROM (CD-ROM).

Which particular SIRViSs are loaded into the client system 1 depends on which topics interest the users of the client system 1. The users' interests may be determined in any of various ways, a discussion of which is not necessary for purposes of practicing the present invention. After each SIRViS is loaded into the client system 1, each SIRViS independently executes on the client system 1 to provide the local users with access to information stored on the content severs 2, in a manner which will be described.

Note that each of the computer systems shown in FIG. 1 may represent a number of interconnected computer systems. For example, although the IAS server 4 is shown as a single computer system, it may actually comprise multiple computer systems, which may be connected to each other on a local area network (LAN) coupled to the Internet 3, or which may be geographically separated and connected to the Internet 3 at different locations. Similarly, the client system 1 or any of the content servers 2 may represent multiple computer systems connected to each other on a LAN, corporate intranet, or the like.

Figure 2:
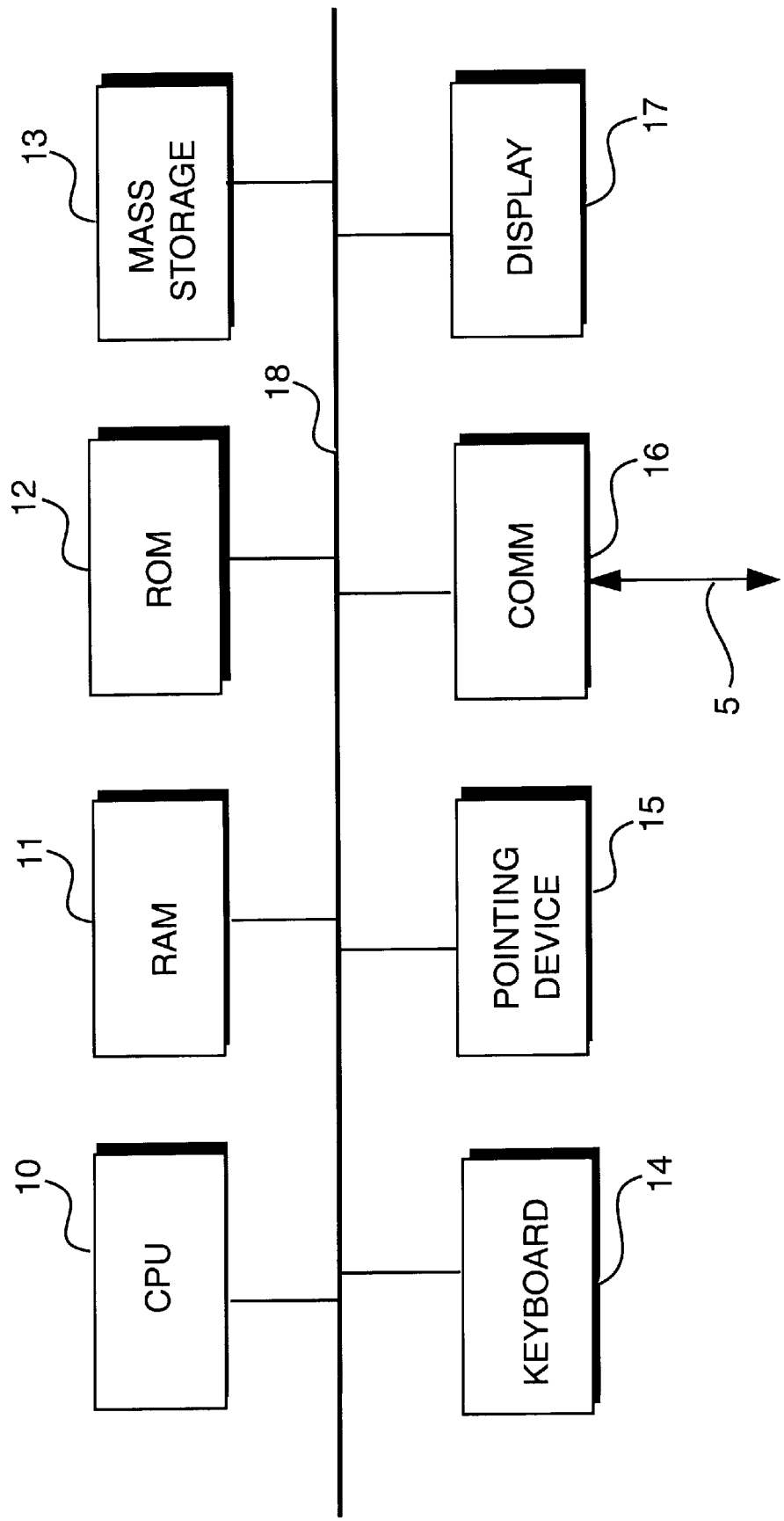
FIG. 2 is a block diagram illustrating an exemplary architecture for any of the computer systems of FIG. 1.

FIG. 2 illustrates, in block diagram form, a computer system architecture that is representative of any of the computer systems shown in FIG. 1. The system shown in FIG. 2 represents a conventional personal computer (PC). Note, however, that many other architectures and types of systems may be employed without departing from the scope of the present invention. Any of the computer systems represented in FIG. 1 may be a less conventional type of computer system. For example, the client system 1 may be a "set-top box" type of processing system that uses a standard television set as a display device.

The computer system of FIG. 2 includes a central processing unit (CPU) 10, random access memory (RAM) 11, read-only memory (ROM) 12, each connected to a bus system 18. The bus system 18 in FIG. 2 may represent one or more buses connected to each other through various bridges, controllers and/or adapters, such as are well-known in the art. For example, the bus system 18 may include a system bus which connects CPU 10 to RAM 11 and which is connected through an adapter to one or more expansion buses, such as a Peripheral Component Interconnect (PCI) bus. Also coupled to the bus system 18 are a mass storage device 13, a keyboard 14, a pointing device 15, a data communication device 16, and a display device 17.

The pointing device 15 may be any suitable device for enabling a user to position a cursor or pointer on the display device 17, such as a mouse, trackball, touchpad, stylus with light pen, or the like. The display device 17 may be any suitable device for displaying alphanumeric, graphical and/or video data to a user, such as a cathode ray tube (CRT), a liquid crystal display (LCD), or the like. Mass storage device 17 may be any suitable device for storing large volumes of data, such as a magnetic disk or tape, an MO storage device, or any of various types of optical storage media, such as DVD, CD-ROM, etc. Data communication device 19 may be any device suitable for or enabling the computer system to communicate data with a remote computer system over communication link 5, such as a conventional telephone modem, a cable television modem, an Integrated Services Digital Network (ISDN) adapter, a Digital Subscriber Line (xDSL) adapter, or the like.

The elements shown in FIG. 2 perform their conventional functions known in the art. In particular, mass storage 13 is used to provide non-volatile storage of software instructions and data, whereas RAM 11 is a system memory for providing temporary storage of the data and the software instructions when executed by the CPU 10. Software instructions for implementing the SIRViS and other aspects of the present invention may be downloaded to mass storage device 13 and/or RAM 11 from a remote server via the network connection 5.

Figure 3:
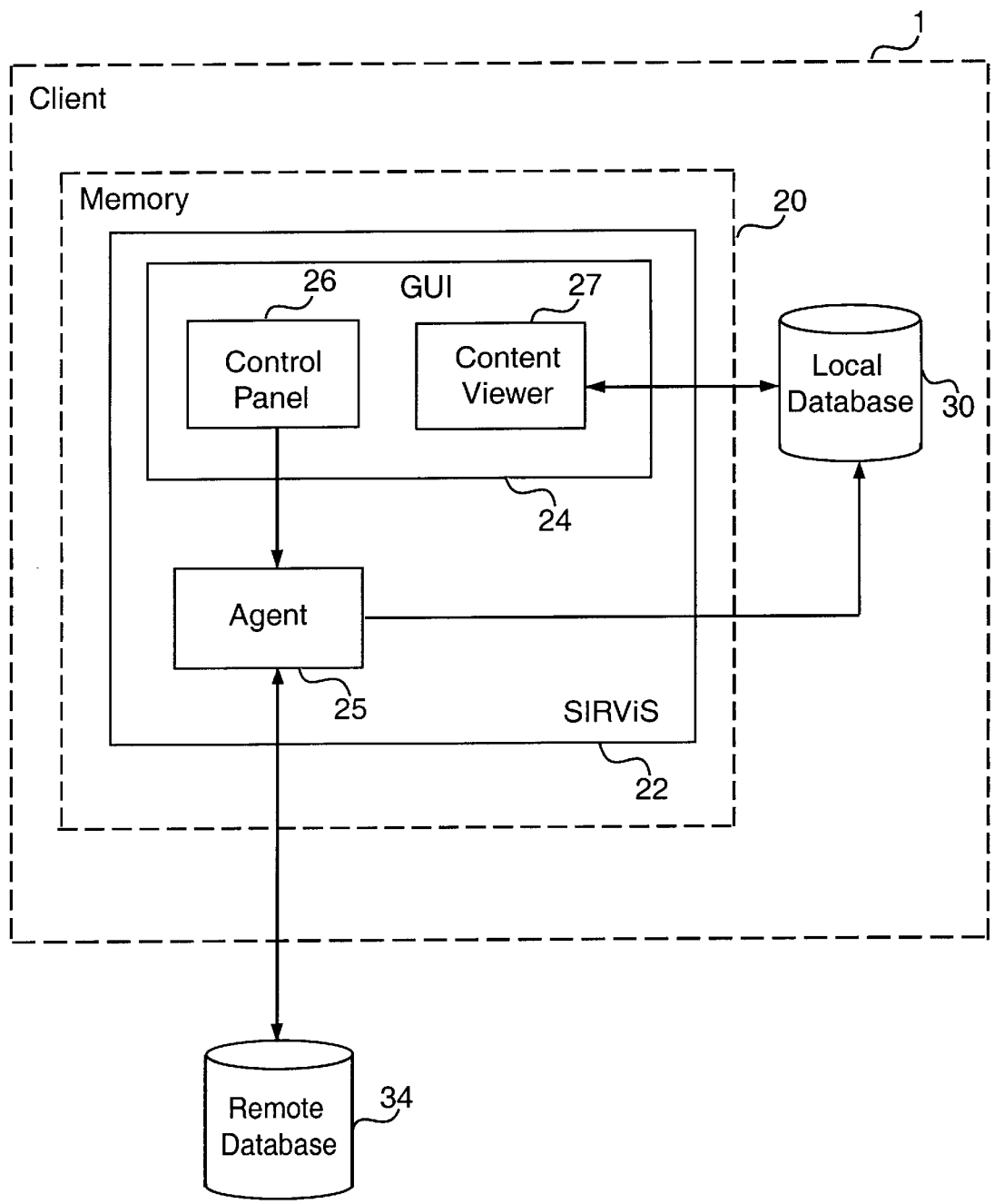
FIG. 3 is a block diagram illustrating a subject-specific information retrieval and viewing system (SIRViS).

FIG. 3 illustrates an embodiment of the SIRViS of the present invention. As noted, the SIRViS may be embodied as software executing on the client system 1. Hence, in FIG. 3, SIRViS 22 is shown as stored within a memory 20 in the client system 1. Memory 20 may represent RAM 11 or mass storage device 13 in FIG. 3, for example, or a combination of those elements. Note that while various functions are attributed in this description to the SIRViS and its components, in the case of a software embodiment, it is actually the execution by a processor (e.g., CPU 10) of software instructions representing the SIRViS and its components which causes the described functions to occur.

The SIRViS 22 includes a GUI 24 and a search agent 25 configured to cooperate with each other. The GUI 24 includes a control panel component 26 and a content viewer component 27. The control panel 26 allows each user of the client system 1 to create his own unique set of configurations, or search rules, which are stored within the client system 1. Thus, each member of a family having a home PC, for example, can define his or her own set of search rules for accessing information on a particular subject area. The control panel 26 may also provide various other functions for allowing a user to control and maintain the SIRViS 22. The control panel 26 interacts with users via dialog boxes and other features associated with conventional windows-based environments. These features may be manipulated by the user using well-known techniques, such as the manual positioning of a pointer or cursor on a display device using a mouse, trackball, touchpad, or other pointing device.

In alternative embodiments, search rules may not be specified explicitly by a user. Instead, search rules may be generated automatically based on observations of the users's actions, such as which types of on-line information the user accesses most frequently. In that case, such observation and/or rule generation functions may be performed by the control panel 26, by a dedicated rule generation component within the SIRViS, or by an entity separate from the SIRViS 22.

The search agent 25 is a search engine which separately uses each set of search rules to access information on a predefined subject area in one or more remote databases 34. The remote databases 34 are stored in one or more of the remote content servers 2 (see FIG. 1). The search agent 25 may access the remote databases 34 at regular, predefined intervals or at pre-specified days or times. The agent 25 stores the retrieved information in a local database 30. In doing so, the search agent 25 creates an association in the local database 30 between stored groups of information and the corresponding set of search rules used to retrieve the groups of information, thereby associating information with particular users.

The search agent is generally described herein as residing on the client system 1. Note, however, that in alternative embodiments of the present invention, the search agent 25 may be located remotely from the client system 1 and/or separate from the GUI 24. For example, the search agent 25 might be local to a remote database 34 and therefore might reside in one of the remote content servers 2. In that case, communication between the search agent 25 and the GUI 24 may take place over the Internet 3.

The local database 30 is a structured database (e.g., relational, object oriented, etc.), which allows structured, field-based queries, such as in a structured query language (SQL) database (as opposed to text searches). The local database 30 may be located within the client system 1, as shown in FIG. 3, although that is not necessarily the case. However, the local database 30 is much "closer" to the client system 1 in terms of data access time than are the remote databases 34. The local database 30 may be stored in a mass storage device, such as mass storage device 13 in FIG. 2.

When a user wishes to view the retrieved data for the defined subject area, the user invokes the content viewer 27, which accesses the information from the local database 30 and displays it to the user. The content viewer 27 provides a conventional windows-based environment to interact with the user. In certain embodiments, the content viewer 27 may provide an environment in which the user identifies himself or is automatically identified by the client system 1, and the user, from the point of identification, is presented with, or is only allowed access to, content collected based on his or her own set of search rules for the given subject area.

Hence, each SIRViS 22 is custom designed to retrieve and display to a user information relating to a particular subject area. Accordingly, the control panel 26, agent 25, and content viewer 27 are specifically designed to access a specific class of information stored according to a particular, predefined structure. Specifically, the control panel 26 is custom designed to enable multiple users to each specify their own set of search rules for the particular subject area. The agent 25 is designed to use these sets of search rules to retrieve a specific type of information from the predefined remote databases 34 and to store that information in the local database 30 using the same data structure in which the data is stored in the remote databases 34. The agent 25 therefore maintains knowledge of which remote databases to search. Such knowledge may be in the form of a simple stored list of paths to one or more data files. The content viewer 27 is designed to have knowledge of this data structure and to retrieve the information from the local database 30 accordingly. The content viewer 27 is further designed to retrieve stored information associated with a particular user (i.e., information retrieved using a particular set of search rules).

Figure 4:
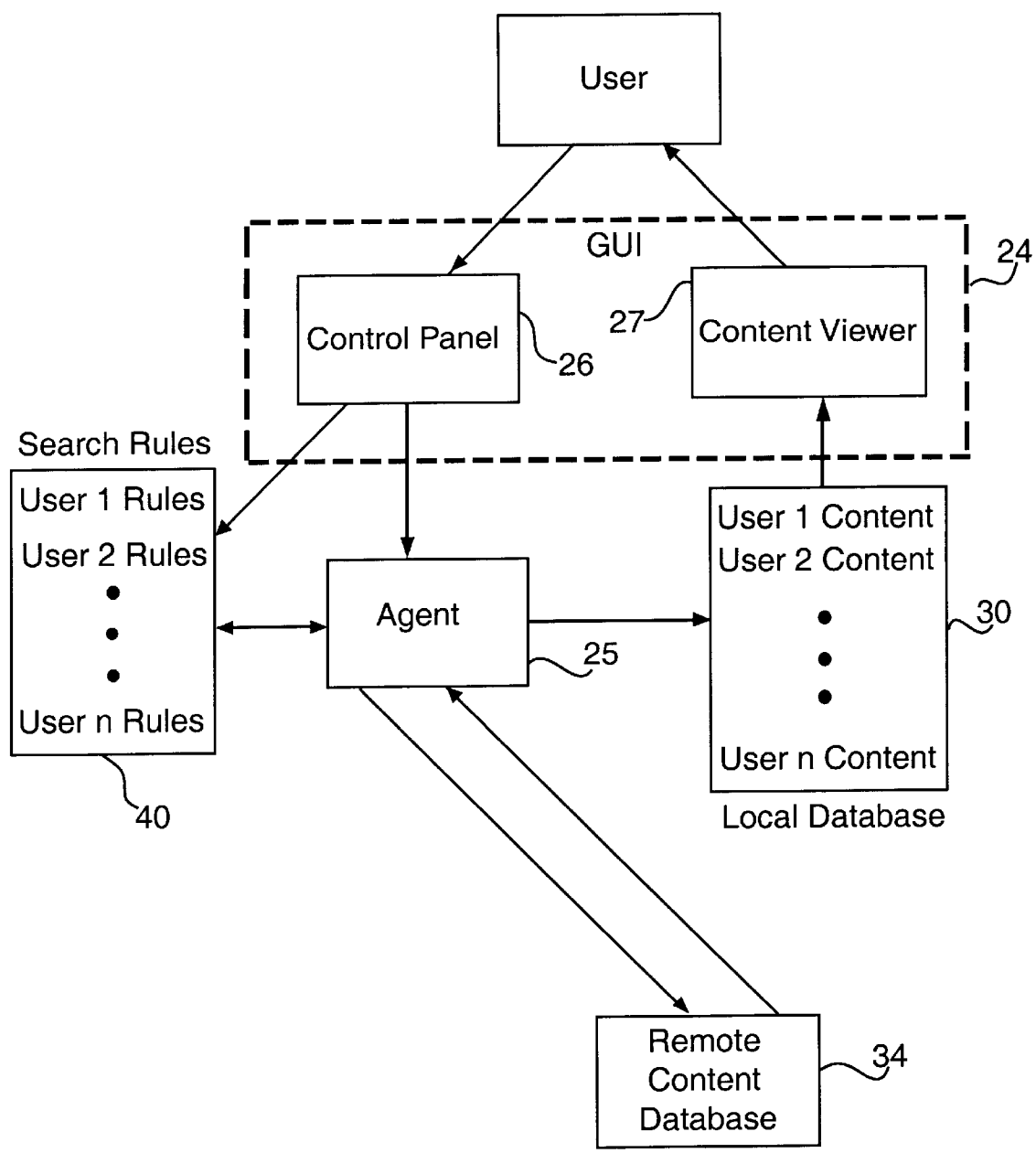
FIG. 4 is a block diagram illustrating certain functions of a SIRViS in greater detail.

Referring now to FIG. 4, when a user invokes the SIRViS 22 for the first time after it is loaded into the client system 1, the user accesses the control panel 26 to define his set of search rules for the relevant subject area. The control panel 26, therefore, maintains a dataset 40 containing the search rules for all of the authorized users of the client system 1. The agent 25 accesses the dataset 40, selects the set of rules for a particular user, retrieves information from the remote database 34, and stores the information within the local database 30, including associating the retrieved information with a particular user (or set of search rules). In one embodiment, the agent 25 searches the remote database 34 on behalf of one or more users regardless of whether the client system 1 is currently in use by any user; hence, searches are generally performed automatically. Searches may be performed periodically or at specified days or times. However, it is also contemplated that the agent 25 may initiate a search of the remote databases 34 directly in response to a user request.

Figure 5:
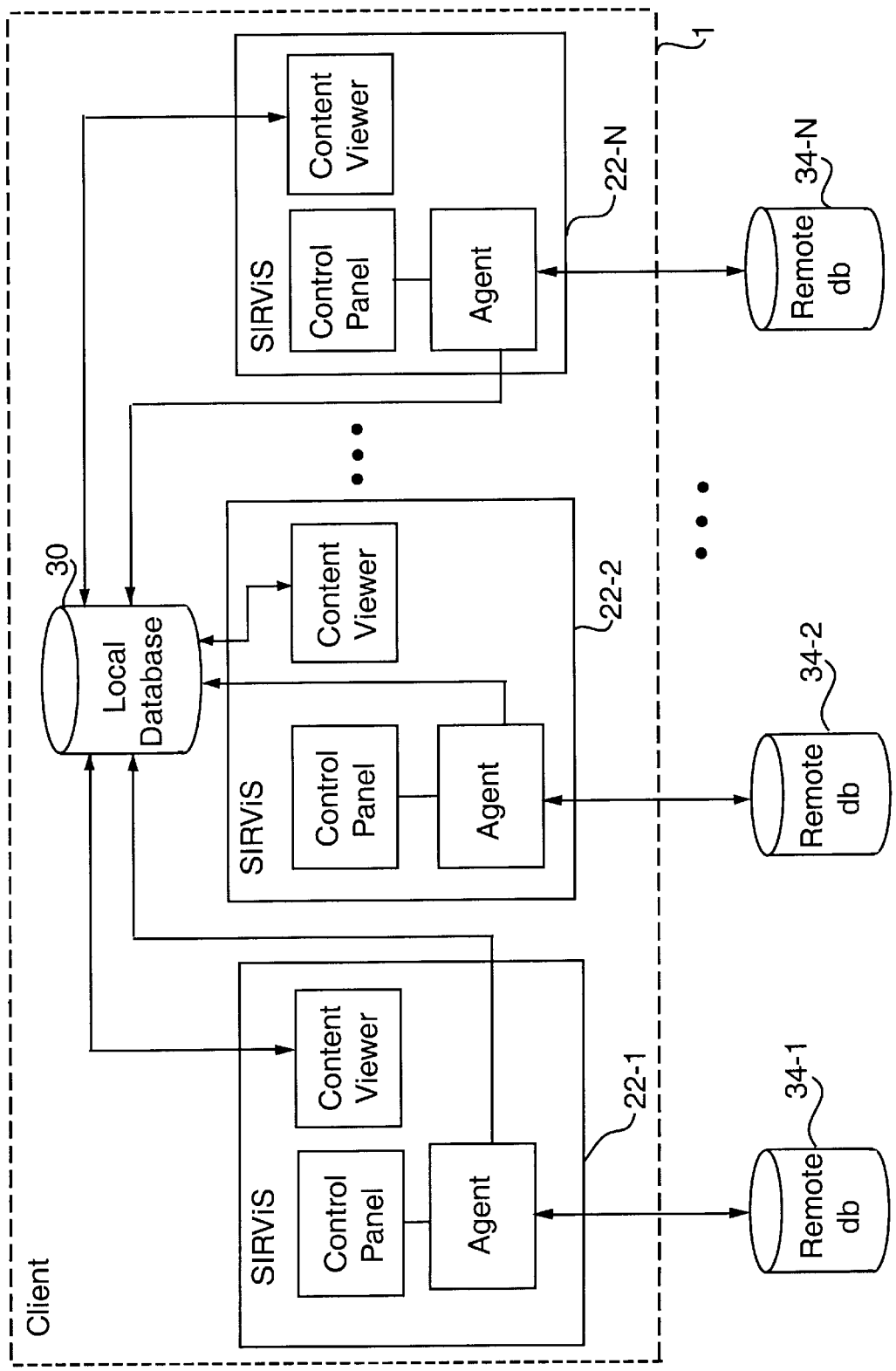
FIG. 5 is a block diagram illustrating a local computer system including a number of SIRViS.

The client system 1 may include more than one SIRViS, each of which relates to a different subject area. Thus, as shown in FIG. 5, the client system 1 may include a number of individual SIRViSs, 22-1, 22-2, . . . , 22-N, each of which relates to a particular subject area. Each of the SIRViSs 22-1 through 22-N is configured to access data from a particular group of remote databases 34-1, 34-2, . . . , 34-N, respectively, and to store that information in the local database 30. If desired, multiple local databases may be used, such as one for each SIRViS.

Because information is retrieved by the SIRViS automatically and stored in the local database, the speed at which a user can access and view this information is improved in comparison with conventional technologies. Moreover, because each SIRViS is customized to retrieve information for a particular subject area and to retain the structure in which that information is stored, the information is stored in the local database in a far more organized manner than with conventional information retrieval tools. The present invention, therefore, allows a user to access information on a given topic much more quickly and easily than with conventional information access tools.

In addition to the functions described above, a SIRViS may include the capability to automatically update itself in order to identify newly available remote databases or to provide improved functionality. Thus, referring to FIG. 6, a SIRViS 22b according to one embodiment includes an update unit 44, in addition to the components mentioned above. The update unit 44 causes the SIRViS 22b to automatically update itself when an updated version is available, such as when the list of remote databases has been updated or when the program code has been improved. When a more updated version of the SIRViS is available, the update unit 44 automatically causes the update to be downloaded to the client system 1 from a remote server. The update unit 44 may automatically query the IAS server 4 to determine if an update is available, or it may simply wait for a message from the IAS server 4 indicating that an update is available. Updating the SIRViS 22b may entail replacing or modifying the entire SIRViS 22b or particular components of the SIRViS 22b, such as the agent 25, the control panel 26, and/or the content viewer 27.

Figure 6:
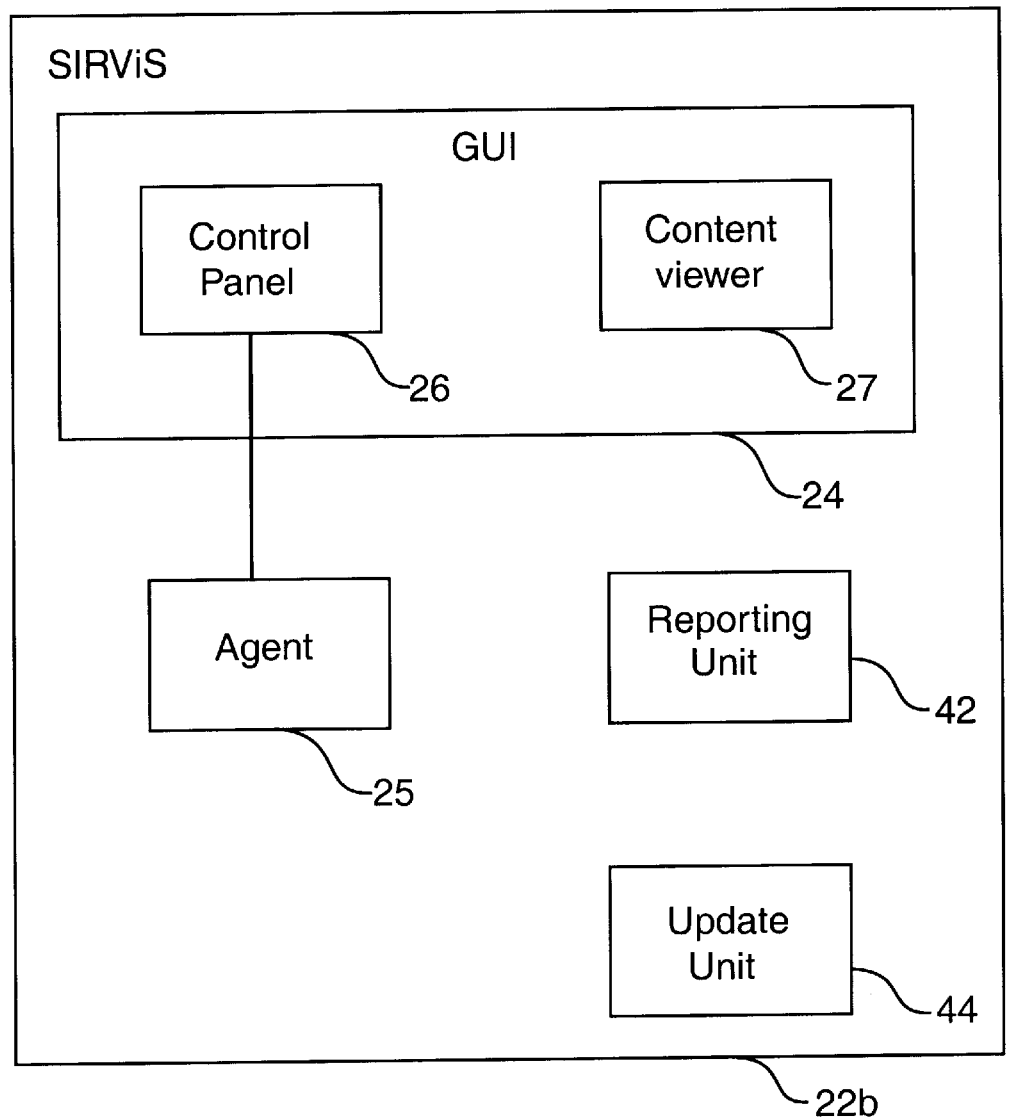
FIG. 6 is a block diagram illustrating a SIRViS including a reporting unit and an update unit.

A SIRViS of the present invention may also include the capability to record accesses by a given user to particular pieces of content stored in a local database, and to report these accesses, either in real-time or in batch mode, to some remote database, such as the system server 4, or one of the content servers 2. This information may be used by the IAS or third parties to maintain user profiles. Accordingly, as shown in FIG. 6, the SIRViS 22b of the present invention includes a reporting unit 42 for performing these recording and reporting functions. Note that while the reporting unit 42 and the update unit 44 are shown as components of the SIRViS 22b, alternatively they may be provided as separate entities which function independently of the SIRViS 22b.

Thus, an agent based on-line information retrieval and viewing system has been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A device for providing a plurality of local users with information stored remotely on a network, the device comprising:

a rule generation unit configured to define, for each of the plurality of local users, a set of search rules applicable to a predefined subject; and a search agent configured to retrieve information on only the predefined subject from a database on the network based on each set of search rules and to store the retrieved information in a local database.

2. A device according to claim 1, further comprising a user interface configured to enable each of the plurality of local users to access, from the local database, the information on the predefined subject associated with the corresponding set of search criteria.

3. A device according to claim 1, wherein the search agent is further configured to create an association in the local database between the retrieved information and particular ones of the local users based on the set of search rules used to retrieve the information.

4. A device according to claim 1, wherein the information is stored in the remote database according to a structure, and wherein the agent is further configured to store the information in the local database according to said structure.

5. A processing system for providing a plurality of local users with information stored remotely over a network, the system comprising:

a first user interface for enabling each of a plurality of local users to define a different corresponding set of search rules applicable to a predefined subject;

a search agent configured to receive each set of search rules and to automatically retrieve information on only the predefined subject from a database on the network based on each set of search rules and to store the retrieved information in a local database; and a second user interface for enabling each of the plurality of local users to access from the local database a portion of the information on the predefined subject associated with the corresponding set of search rules.

6. A processing system according to claim 5, wherein the information stored in the remote database comprises a plurality of records, each of the records having a structure, and wherein the agent stores the information in the local database in the form of records having said structure.

7. A processing system according to claim 5, further comprising an update unit for periodically determining whether an updated version of the search agent is available from a remote database and, if an updated version is available, for retrieving the updated version.

8. A processing system according to claim 5, further comprising an update unit for periodically determining whether an updated version of any of the search agent, the first user interface, or the second user interface is available from a remote database and, if an updated version is available, for retrieving the updated version.

9. A processing system according to claim 5, further comprising a reporting unit for automatically reporting, to a remote computer system, accesses to the local database.

10. A processing system according to claim 9, the reporting unit further for reporting accesses to particular types of content in the local database.

11. A processing system according to claim 9, the reporting unit further for reporting accesses to the local database by a particular user.

12. A processing system according to claim 5, the second user interface comprising:

means for receiving user inputs identifying one of the local users; and means for retrieving from the local database only a portion of the information on the predefined subject, the portion corresponding to the set of search rules associated with said one of the local users; and means for outputting the portion of the information.

13. A local computer system connected to a plurality of remote computer systems on a network, the local computer system comprising:

a plurality of user interface units configured to receive user inputs, each user interface unit associated with a different one of a plurality of subject areas, each user interface unit further configured to receive, from each of a plurality of users, a separate set of search rules relating to the associated subject area;

a plurality of agents, each agent associated with one of the subject areas, each agent configured to retrieve information related to the associated subject area from at least one of the remote computer systems based on at least one specified set of search rules and to store the retrieved information in a local database; and a plurality of viewing units, each viewing unit configured to retrieve information from the local database corresponding to one of the subject areas in response to inputs from any of the plurality of users and to display the retrieved information.

14. A local processing system according to claim 13, wherein each of the viewing units is further configured to receive user inputs identifying one of the users and to retrieve from the local database information corresponding to the set of search rules associated with said one of the users.

15. A local processing system according to claim 13, further comprising a reporting unit for reporting accesses to the local database to a remote computer system.

16. A local processing system according to claim 13, wherein the information is stored in each of the remote computer systems according to a structure, and wherein the agent maintains each said structure when storing the information in the local database.

17. A local processing system according to claim 13, further comprising an update unit configured to periodically determine whether an updated version of the search agent is available from a remote database and, if an updated version is available, to retrieve the updated version.

18. A local processing system according to claim 13, further comprising a reporting unit configured to report accesses to the local database to a remote computer system.

19. A local processing system according to claim 13, wherein the network is a wide area network.

20. A method of providing a plurality of local users with information stored remotely on a network, the method comprising:

for each of the plurality of local users, generating a unique set of search criteria relating to a single, predefined subject;

retrieving information relating to only the predefined subject from a database on the network based on each set of search criteria; and storing the retrieved information in a local database accessible to the plurality of local users.

21. A method according to claim 20, wherein said storing comprises creating an association in the local database between the retrieved information and particular ones of the local users based on the set of search criteria used to retrieve the information.

22. A method according to claim 20, further comprising:

receiving a query, the query including information identifying one of the local users; and retrieving from the local database only a portion of the information on the predefined subject, the portion corresponding to the set of search criteria associated with said one of the local users; and outputting the portion of the information.

23. A method according to claim 20, wherein said generating comprises inputting each set of search criteria at one processing system on the network, the network comprising a plurality of processing systems.

24. A method according to claim 23, wherein said outputting comprises outputting the portion of the information from said one processing system.

25. A method according to claim 20, wherein the information is stored in the remote database according to a structure, and wherein storing the retrieved information in a local database comprise storing the information in the local database using the same structure in which said information was stored in the remote database.

26. A method according to claim 20, further comprising reporting accesses to the local database to a remote computer system.

27. A method according to claim 26, wherein said reporting accesses comprises reporting accesses to particular types of content in the local database.

28. A method according to claim 26, wherein said reporting accesses comprises reporting accesses to the local database by a particular user.

29. A method of providing a plurality of local users with information stored remotely over a network, the method comprising:

using a computer system on the network to receive a set of user inputs from each of the plurality local users, each set of user inputs for creating a set of search rules for the corresponding local user for a predefined subject;

retrieving information relating to only the predefined subject from a remote database on the network;

storing the retrieved information on the predefined subject in a local database;

receiving a set of user inputs from one of the local users; and responding to the set of user inputs by retrieving from the local database a portion of the information on the predefined subject, the portion corresponding to the set of search rules associated with said one of the local users, and by outputting the information to said one of the local users.

30. A method according to claim 29, wherein receiving the set of user inputs from said one of the local users comprises using the computer system to receive the set of user inputs from said one of the local users; and wherein outputting the information to said one of the local users comprises using the computer system to output the information to said one of the local users.

31. A method according to claim 29, wherein the information is stored in the remote database according to a structure, and wherein storing the retrieved information in a local database comprise storing the information in the local database using the same structure in which said information was stored in the remote database.

32. A processing system for providing a plurality of local users with records stored remotely, the processing system comprising:

a first user interface to enable each of a plurality of local users to define a different corresponding set of search rules applicable to a predefined subject;

a remote database having a plurality of records with a structure;

a search agent to receive each set of search rules and to automatically retrieve records on only the predefined subject from the remote database based on each set of search rules and to store the retrieved records in a local database with the same structure as the remote database; and a second user interface to enable each of the plurality of local users to access from the local database a portion of the records on the predefined subject associated with the corresponding set of search rules.

33. A method of providing a plurality of local users with information stored remotely on a network, the method comprising:

receiving from a plurality of user interface units a corresponding set of search criteria;

generating unique sets of search criteria relating to predefined subjects;

retrieving from a remote structured database on the network only those records relating to the predefined subjects based on the unique sets of search criteria;

storing on a local computer system the retrieved records in the same structure as the remote structured database; and presenting to the plurality of user interface units records retrieved from the local computer system corresponding to the set of search criteria.

* * * * *